Patented Aug. 5, 1952

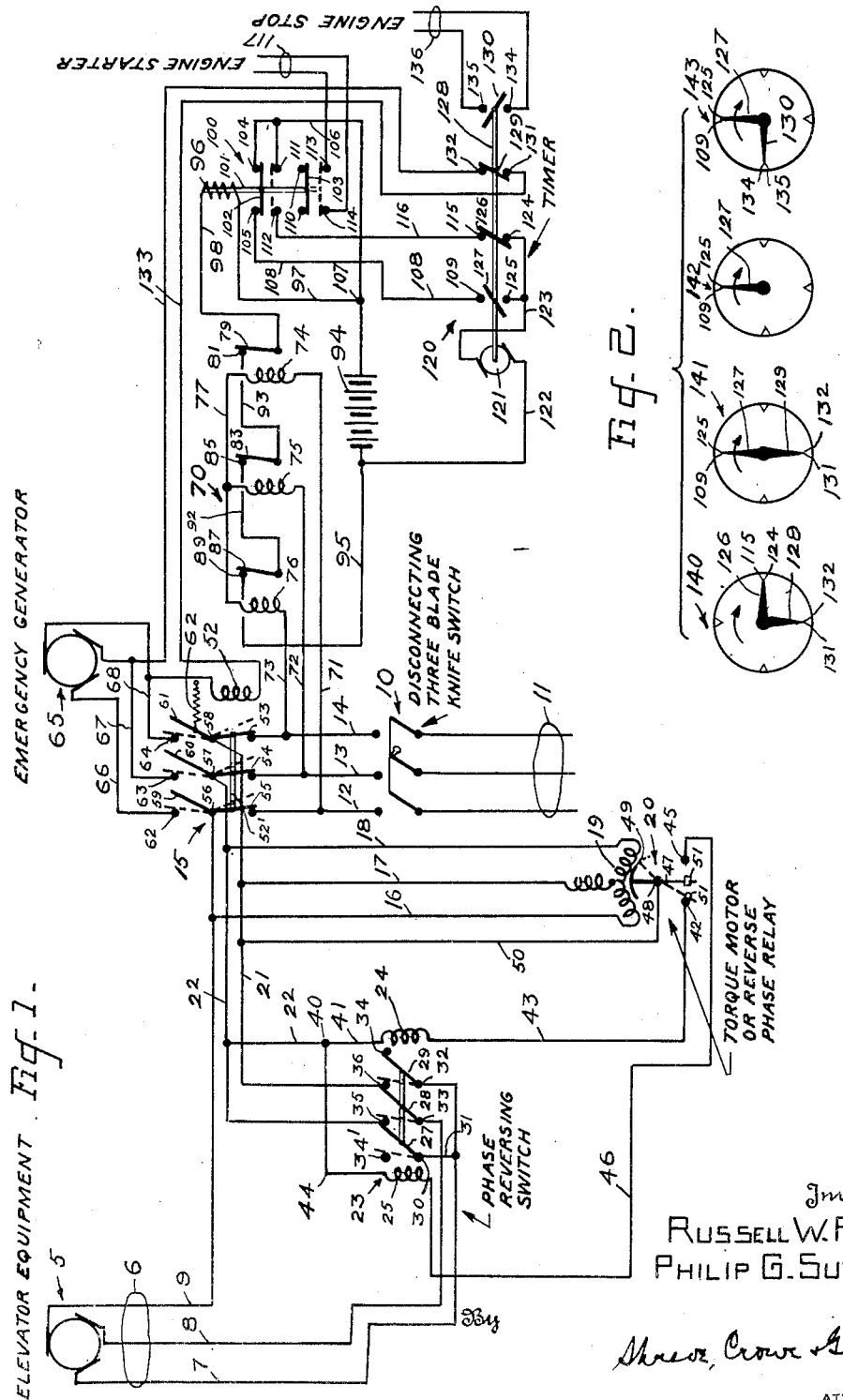

2,606,217

UNITED STATES PATENT OFFICE 2,606,217

AUXILIARY ELEVATOR CONTROL APPARATUS

Russell W. Raine, Coral Gables, and Philip G. Sutker, Miami Beach, Fla.

Application April 18, 1949, Serial No. 88,064

11 Claims. (Cl. 171—97)

This invention relates to a new and improved application of auxiliary power for an electrically-driven elevator and to the automatic control for the operation thereof.

In buildings having electrically-driven elevator service, it is customary to receive the electrical supply from the main line of the power company entering the building where the elevator is located, such as is furnished for a whole city or community by public utility company, privately owned diesel electric plant or other generating sources.

It frequently happens that the source of electrical supply from the main line will fail due to emergencies arising in the power plant or along the distribution system. Again in the case of an emergency occurring in the building, such as in the case of fire, it is customary for the fire department or other authorities to cut the entire building off from the main line source of electrical supply.

Any failure or disconnecting from the building of the main line source of electrical supply into the elevator equipment operating the elevator or elevators seriously disrupts the service rendered by the elevator and in the case of emergency such as fire and the like a disruption of the elevator service in a building immediately becomes a hazard to the occupants of that building.

Accordingly, an object of this invention is to provide automatic controls for an auxiliary power unit which will automatically supply current to an electrically-driven elevator that comes into operation upon discontinuance for any reason of the main line source of elecrical supply.

Heretofore auxiliary electrical power units for elevators have been provided that operate on batteries which in turn drive or supply power to a direct current electric elevator equipment, as specifically set forth in the patent to Davis et al., No. 1,399,605. Auxiliary units such as these have many drawbacks. To mention only a few they will serve to operate only on elevator equipment running on direct current, the auxiliary unit must be manually operated and set in to contact with the equipment by an attendant, they are neither designed or intended to operate with the three-phase electric elevator equipment in present-day use, are not sensitive to failure of any phase of the current but only to the complete failure of the current, and lastly the batteries require constant charging, maintenance and replacement.

Accordingly, it is a further object of this invention to provide a new and improved auxiliary power unit application that overcomes these objections and is automatically controlled for 3 phase electric elevator equipment, the power unit of which consists of an electrical generator driven by an internal combustion engine that supplies a three-phase electric current to the elevator equipment.

Another object of this invention is to provide a fully automatic control for the auxiliary power generating unit that will start the internal combustion engine and drive the auxiliary generator upon failure for any reason of th entire main line current supply into the elevator equipment or upon failure of any phase thereof.

A further object of this invention is to provide a control for the auxiliary power unit that automatically disconnects the elevator equipment entirely from the main line supply and connects the elevator equipment to the auxiliary generator upon failure of the entire main line current or any phase thereof.

Another object of this invention is to provide a control that upon full three-phase energization of the main line source of supply will automatically shut down the internal combustion engine driving the auxiliary generator, disconnect the elevator equipment from the generator and again connect the elevator equipment to the fully operating main line source of electrical supply.

A further object of this invention is to provide a control for activating and de-activating an auxiliary power unit for a three-phase elevator equipment that is fully automatic and is prevented from "hunting."

Yet a further object of this invention is to provide a timed delay in the automatic control of the auxiliary power unit that will function upon the reactivation of the main power supply.

Again it is recognized that in three-phase power generation of both the main line and auxiliary power supply and that in switching from one supply to the other there may occur a reversal of the phases to the elevator equipment, thus doing considerable damage to the mechanism of the elevator equipment and in some instances even preventing operation of the elevator equipment. Accordingly, it is a further object of this invention to provide a phase reversal control in the system that will insure a delivery of the proper phase rotation of current to the elevator equipment at all times and under all conditions, whether the source of electrical supply to the elevator equipment be from the main line or the auxiliary power unit.

Other objects and advantages of this invention will become apparent as the discussion proceeds and is considered in connection with the accompanying claims and drawings, in which—

Fig. 1 is a diagrammatic view of the entire system embodied in this invention showing the phase reversal control, the time delay circuit, as well as the elevator equipment and emergency generator.

Fig. 2 is a schematic showing of the switches operated by the timer equipment during the complete cycle of operation of the system embodied by our invention.

Referring now to a detailed discussion of the drawings, the numeral 5 designates generally a three-phase alternating current motor for driving an elevator or elevator equipment. Connected to this motor are three lines designated generally by the numeral 6, and severally by the numerals 7, 8 and 9. Connected to the lines 7, 8 and 9 by means of a switch 10, which may be of any type desired such as a three-blade knife switch, is a main line source of supply designated generally by the numeral 11 and customarily furnished by a city power plant, public utility or the like.

The power supply 11 is connected into the system by means of three lines designated generally as 12, 13 and 14. The lines 12, 13 and 14 are connected to the lines 7, 8 and 9 by means of an electrically operated switch 15, shown in a closed position to the power line 11 in Fig. 1.

Shunted across the lines 7, 8 and 9 are connectors 16, 17 and 18 which connect to a winding 19 of a torque motor or reverse phase relay, designated generally by the numeral 20. The center tap of the winding 19 is connected by the line 17 to a line 21, which in turn is connected through the switch 15 to the line 14. One side of the primary winding 19 is connected by the line 16 to the line 9, which in turn is connected by means of the switch 15 to line 12 of the main line source of supply. The opposite side of the primary winding 19 of the reverse phase relay is connected by means of line 18 to line 22, which in turn is connected by means of the switch 15 to line 13 of the main line source of supply.

A phase reversing switch, designated generally by the numeral 23, is provided in series with lines 21 and 22 and connects these lines alternately with lines 7 and 8. The phase reversing switch 23 consists of a pair of solenoids or the equivalent 24 and 25 operating a bar 26, in turn pivotally connected to blades 27, 28 and 29 of the switch proper. The blade 27 is also pivoted at 30 to a connector line 31 making contact with line 7. Blade 29 is also pivotally connected to a contact 32 also making connection with line 7. Whereas blade 28 is pivotally connected at 33 to a connector going to line 8. There is a dead contact 34 with which blade 29 makes contact in one position, blades 27 and 28 at the same time making connection with contacts 35 and 36 which are respectively connected to lines 22 and 21. Upon reversal of the phase relay switch, the blades 27, 28 and 29 take the position shown by dotted lines. Blade 27 makes contact with a dead contact 34', blades 28 and 29 making connection with contacts 35 and 36 respectively.

The coil 24 is connected at 40 to line 22 by means of a connector 41 and to a contact 42 of the reverse phase relay 20 by means of line 43. The coil 25 is also universally connected to the line 22 by means of connector 40 through a line 44 and to contact 45 of the reverse phase relay 20 by means of a line 46.

From the foregoing, it will be apparent that the operation of the phase reversing switch is controlled by the torque motor or reverse phase relay, the operation being simply that an arm 47 pivoted about a bearing 48 and provided with an armature 49 is connected to line 21 by means of line 50. When the current into the primary winding 19 of the reverse phase relay is rotating in one direction, the armature 49 will be pulled in one direction and a contact 51 will close against either contact 42 or 45, depending upon the direction of phase rotation of the current passing through the winding 19. If the current is in a clockwise direction through the lines 16, 17 and 18, the armature 49 will be pulled to the dotted line position shown and will actuate the coil 24, which in turn will operate the phase reversing switch 23 into the position as shown. Upon reversal of the phase rotation of the current through the lines 16, 17 and 18, the contact 51 will be closed with the contact 45, thus actuating the coil 25 and de-energizing the coil 24. This will throw the phase reversing switch 23 into the position shown by the dotted lines and the current flowing from lines 21 and 22 into the lines 7 and 8 will be reversed.

Turning now to a detailed description of the electrically actuated switch 15, of any conventional type, the coil of which is designated by the numeral 52, actuates the armature 52', which in turn is pivotally connected to blades 53, 54 and 55 pivoted about points 56, 57 and 58. There is a second series of blades connected rigidly to blades 53, 54 and 55, designated by the numerals 59, 60 and 61. A spring 62' can be connected to blade 61 to cause the switch 15 to normally remain in a closed position, as shown in Fig. 1, which connects the elevator equipment to the main line source of supply 11 or this device may be gravity-operated being in a normal down position without mechanical means of holding same in this position.

Upon energization of the coil 52 the switch 15 will take the position shown by dotted lines, opening the blades 53, 54 and 55 from the lines 14, 13 and 12, respectively, and closing the blades 59, 60 and 61 against contacts 62, 63 and 64. Contacts 62, 63 and 64 are connected to an alternating current three-phase generator 65 by means of lines 66, 67 and 68.

Turning now for a moment to a general description of phase failure relays designated generally by the numeral 70, lines 71, 72 and 73 are connected, respectively, to lines 12, 13 and 14 of the main line source of supply 11. Lines 71, 72 and 73 are connected in Y with coils 74, 75 and 76, relay 74 being connected on one side to line 71 and on the other side to line 77, which in turn is connected to both relays 75 and 76; and relay 75 is connected on one side to line 72 and to the other side by means of line 77 to relays 74 and 76; relay 76 is connected on one side to line 73 and on the other side by means of line 77 to relays 74 and 75.

Relay 74 is provided with an armature 79 that acts as a switch blade and makes contact with contact 81 connecting line 98 to line 93; relay 75 is provided with an armature that acts as switch blade 83 which connects the contact 85. This connects line 93 to line 92. Relay 76 is provided with an armature that acts as switch blade 87 which makes contact with contact 89 connecting line 92 to line 95.

The electrical contact 81 is connected to switch blade 83 by means of a line 93 and electrical contact 85 is connected to switch blade 87 by means of line 92. Electrical contact 89 is connected to a battery 94 by means of a line 95. Battery 94 in turn is connected to a relay 96 by means of line 97 and relay 96 in turn is connected to electrical contact blade 79 by means of line 98.

Turning for a moment to the operation of the phase failure relays, it will be seen from the above that the relays 74, 75 and 76, respectively, are connected in Y across lines 12, 13 and 14 of the main line source of electrical supply 11. The electrical switches 79, 83 and 87 operated by relays 74, 75 and 76, respectively, are connected in series with each other, with the battery 94 and with relay 96. Upon failure of the main line source of current 11 or any one phase thereof, the relays 74, 75 and 76, or any one relay, will become de-energized and the switches 79, 83 and 87 or any switch in which the relay has become de-energized will open. The de-energization of any of the relays 74, 75 and 76 will open the circuit through relay 96, thus de-energizing the same.

Turning now to a detailed description of the switch, designated generally by the numeral 100 operated by the relay 96, the numeral 101 designates an armature of relay 96. To the armature 101 are rigidly connected arms 102 and 103. Arm 102 closes contacts 104 and 105 and to contact 104 is connected line 106, which in turn is connected into line 97 at 107 and contact 105 is connected by means of line 108 to a contact 109. Contacts 110 are dead. Switch 100 is gravity operated and remains in the position shown in solid lines only when the relay 96 is energized. When relay 96 is de-energized, armature 101 drops downward by gravity and arms 102 and 103 take the position shown by dotted lines. When relay 96 is de-energized, arm 102 connects contacts 111 and 112 and arm 103 connects contacts 113 and 114. Contact 111 is connected to line 106 and contact 112 is connected to contact 115 by means of line 116. Contacts 113 and 114 are connected by means of lines 117 to starting equipment of an internal combustion engine (not shown). The internal combustion engine in turn drives generator 65.

Turning now to a detailed description of the timer designated generally by the numeral 120, 121 is a direct current motor connected by means of line 122 to battery 94 and by means of line 123 and contacts 124 and 125 to switch arms 126 and 127 to lines 116 and 108, respectively. Connected to the armature of motor 121 is a shaft drive 128 and securely mounted on the drive shaft 128 are arms 126 and 127, as well as arms 129 and 130. It is here pointed out that suitable means of any known type may be provided for adjusting or varying the cycle of rotation of the motor 121.

The switch arm 129 cooperates with contacts 131 and 132, which in turn are connected by means of lines 133 in series with the coil 52 and one phase or side of the alternating current three-phase generator 65; and switch arm 130 cooperates with contacts 134 and 135, which in turn are connected by lines 136 to the internal combustion engine stop which is of conventional design and accordingly not shown in this schematic drawing.

Turning next to a detailed description of the operation of the schematic diagram shown in Fig. 2 of the operation of the timer 121 and the arms 126, 127, 129 and 130, the numeral 140 designates schematically the position of arms 126 and 129 and represents the closing of the contacts 115 and 124, and 131 and 132, respectively, by arms 126 and 129. This represents the position of the timer motor and the contact arms in respect to their contact points during the normal operation of the elevator equipment 5 from the main line source of electrical energy 11. It will be seen from a study of Figs. 1 and 2 that the timer motor 121 is now in a position ready to start operation, that lines 116 and 122 close the motor 121 through the battery 94 and contacts 111 and 112, but the relay 96 being energized the contacts 111 and 112 are open and therefore the motor 121 is in a period of rest. Contacts 131 and 132 being connected in series through the coil 52 and generator 65, this circuit is fully closed. With the emergency generator being shut down during normal operation of the main line source of current 11, the coil 52 will be de-energized and the switch 15 will remain in its normal operating position shown in solid lines.

The second position of the timer motor and switches is designated generally by the numeral 141 in which arms 127 and 129 are in a position to close contact 109, to contact 125, and contact 131 to contact 132, respectively. It will be seen from a study of the drawings that this represents the position of the timer shortly after there has been a failure of the main line source of supply or any one phase of the three-phase current and the relay 96 has been de-energized and the arms 102 and 103 have fallen by gravity into the dotted line positions closing contacts 111, 112, 113, and 114. It will be apparent that the operation of the timer is now in a position to start the internal combustion engine from lines 117, which in turn drives the generator 65. Upon the starting of the generator 65, the circuit to the coil 52 having been closed through line 133 by means of switch 129 closing contact 131 to contact 132, the coil 52 will be energized and will open the blades 53, 54 and 55 to open the circuit to lines 12, 13 and 14, and will close blades 59, 60 and 61 against contacts 62, 63 and 64. This in turn will connect the elevator equipment 5 with the emergency generator 65 and the elevator equipment may then be operated in its normal function from the emergency generator.

Moving now to an explanation of the control when the timer is in the position shown by the schematic diagram designated by the numeral 142, the motor 121 can only be operated through lines 108 and 106 and contacts 109, 125, 124 and 126 and the battery 94; thus with the arm 102 being in an up position closing contacts 104 and 105 and with the relay 96 again energized. This situation will occur upon the reactivation of the main line source of supply 11 with the relays 74, 75 and 76 again all being closed. We now have a time delay to prevent "hunting" of the auxiliary motor and control apparatus in case the auxiliary supply comes on only momentarily and then goes off again, thus preventing the continuous starting and stopping of the internal combustion engine. At position 142 only contacts 109 and 125 are closed by arm 127, contacts 115, 124, 131, 132 and 134 and 135 being open at this position of operation and remaining open for a timed period as controlled by the timer motor 121.

After a predetermined time interval, the motor 121 will rotate or move arms 127 and 130 to the positions shown in the schematic diagram designated generally as 143, and contacts 109 and 125 and 134 and 135 will be the only contacts closed. This position operates the stopping apparatus for the internal combustion engine connected to lines 136; after which with the timer motor still operating until its cycle has been completed, the position of the arms shown by the schematic diagram 140 is again reached, and the motor 121 is stopped thereon ready for the next cycle of operation.

To review very briefly the general operation of the electrically operated auxiliary elevator control apparatus for elevator equipment, the phase reversing switch designated generally by the numeral 23 operated by the torque motor or reverse phase relay will keep the phase rotation of the current going to the elevator equipment 5 in proper phase relation regardless of whether the motor is operating from a main line source of current 11 or an emergency generator 65. The relay 70 will set into operation the controls for starting and stopping the emergency generator 65 upon failure or reactivation of the main line source of current 11 or any single phase thereof and the timer motor 121 activated by the electrically operated switch 96 will control the stopping and starting of the internal combustion engine which drives the emergency generator 65, and at the same time will prevent the control from hunting.

It is to be understood that the variations in switches, torque motor or reverse phase relays, phase reversing switches, timer controls, engine starting and stopping devices and the like may be resorted to without deviating from the spirit of our invention as covered by the following claims.

We claim:

1. An electrical auxiliary elevator control apparatus for electrical elevator operating equipment comprising an electric motor, means for operating an elevator driven by said motor, adapted to primarily be driven by a main line source of alternating current power, an auxiliary source of power for operating said electrical equipment comprising a three-phase alternating current generator, and an internal combustion engine for driving said generator, and control means to automatically alternately connect said elevator equipment to the main line source of power and to the auxiliary source of power, said control means causing the internal combustion engine to operate in timed relation to the function of a main line source of power.

2. An electrical auxiliary elevator control apparatus for electrical elevator operating equipment comprising a main line source of three-phase alternating current power for operating the elevator equipment, an auxiliary source of three-phase alternating current power for operating the elevator equipment, said auxiliary source of power comprising a three-phase alternating current generator, control means to automatically alternately connect said elevator equipment to the main line source of power and to the auxiliary source of power and a phase controlling means connected to the elevator equipment for controlling the current phase rotation to the elevator equipment from both the main and auxiliary sources of power.

3. An electrical auxiliary elevator control apparatus for electrical elevator operating equipment comprising a main line source of three-phase alternating current power for operating the elevator equipment, an auxiliary source of three-phase alternating current power for operating the elevator equipment, said auxiliary source of power comprising a three-phase alternating current generator, control means to automatically alternately connect said elevator equipment to the main line source of power and to the auxiliary source of power and a phase controlling means connected to said elevator equipment for controlling the current phase rotation to said elevator equipment from both the main and auxiliary sources of power, said phase controlling means comprising a reverse phase relay switch connected to the elevator equipment, an electrically operated phase reversing switch having a pair of coils or solenoids connected in series with two of the lines leading to said elevator equipment, a pair of switch contacts connected to said reverse phase relay, each of said contacts being connected in series with one of the said coils or solenoids of the phase reversing switch.

4. An auxiliary elevator control apparatus for electrical elevator operating equipment, comprising a main line source of three-phase alternating current power for operating the elevator equipment, an auxiliary source of three-phase alternating current power for operating the elevator equipment, said auxiliary source of power comprising a three-phase alternating current generator, control means to automatically alternately connect said elevator equipment to the main line source of power and to the auxiliary source of power, said control means comprising electrically operated switches actuated on phase failure and connected to the main line source of power and means controlled by said electrically operated switches for starting and stopping said auxiliary generator and for alternately disconnecting and connecting said electrical elevator equipment from said main line source of power to the auxiliary source of power, and a phase controlling means connected to said elevator equipment for controlling the current phase rotation to said elevator equipment from both the main line and auxiliary sources of power.

5. An electrical auxiliary elevator control apparatus for electrical elevator operating equipment comprising a main line source of three-phase alternating current power for operating said elevator equipment, an auxiliary source of three-phase alternating current power for operating said elevator equipment, said auxiliary source of power comprising a three-phase alternating current generator, control means to automatically alternately connect said elevator equipment to the main line source of power and to the auxiliary source of power, said control means comprising a plurality of phase failure relay switches, said relays being connected in Y across the main line source of power and the switches being connected in series, whereby failure of any one phase of the main line source of supply will open the circuit through said switches, means controlled by said relays for starting and stopping said auxiliary generator and for alternately disconnecting and connecting said elevator equipment from said main line source of power to the auxiliary source of power, and a phase controlling means connected to said elevator equipment for controlling the current phase rotation of said elevator equipment from both the main and auxiliary sources of power.

6. An electrical auxiliary elevator control apparatus for electrical elevator operating equipment comprising a main line source of three-phase alternating current power for operating the elevator equipment, an auxiliary source of three-phase alternating current power for operating the elevator equipment, said auxiliary source of power comprising a three-phase alternating current generator, control means to automatically alternately connect said elevator equipment to the main line source of power and to the auxiliary source of power, said control means comprising a plurality of electrically operated phase failure relay switches, said relays being connected in Y across the main line source of power and the switches being connected in series, whereby failure of any one phase of the main line source of supply will open a circuit through said switches, means controlled by said relays for starting and stopping said auxiliary generator and for alternately disconnecting and connecting said elevator equipment from said main line source of power to the auxiliary source of power in timed relation to the function of the main line source of power, and a phase controlling means connected to said elevator equipment for controlling the current phase rotation to the elevator equipment from both the main and auxiliary sources of power.

7. An electrical auxiliary elevator control apparatus for electrical elevator operating equipment comprising an electric motor, means for operating an elevator driven by said motor, a main line source of power for operating said electric motor, an auxiliary source of power for operating said elevator equipment comprising a three-phase alternating current generator, and an internal combustion engine for driving said generator, an electrically operated phase failure relay switch connected to the main line source of power and means controlled by said relay for starting and stopping the internal combustion engine in timed relation to the function of the said main line source of power.

8. An electrical auxiliary elevator control apparatus for electrical elevator operating equipment comprising an electric motor, means for operating an elevator driven by said motor, a main line source of three-phase alternating current power for operating said electric motor, an auxiliary source of three-phase alternating current power for operating said electric motor, said auxiliary source of power comprising a three-phase alternating current generator, an electrically operated two-way switch adapted to alternately connect said electric motor to said main line and auxiliary source of power, a phase failure relay switch connected to said main line source of power, an electrically operated relay actuated by said phase failure relay switch, said control operating the auxiliary generator in timed relation to the function of the main line source of power and the electrically operated two-way switch in timed relation to the function of the auxiliary power source generator.

9. An electrical auxiliary elevator control apparatus for electrical elevator operating equipment comprising a main line source of three-phase alternating current power for operating said elevator equipment, an auxiliary source of three-phase alternating current power for operating the elevator equipment, said auxiliary source of power comprising a three-phase alternating current generator, an electrically operated two-way switch adapted to alternately connect said elevator operating equipment to said main line and to auxiliary sources of power, a phase failure relay switch connected to said main line source of power, an electrically operated relay actuated by said phase failure relay switch, said control operating the auxiliary generator in timed relation to the function of the main line source of power and the electrically operated two-way switch in timed relation to the function of the auxiliary power source generator, said electrical control comprising an electrically operated switch connected with said phase failure relays and a constant source of electrical energy, an electrically operated two-way switch actuated by the last mentioned relay, a timer motor operated by said electrically operated two-way switch and movable contacts operated by said motor for controlling the circuits to the electrically operated two-way switch, the auxiliary generator and the elevator equipment itself in timed relation.

10. An electrical auxiliary elevator control apparatus for electrical elevator operating equipment comprising a main line source of three-phase alternating current power for operating said elevator equipment, an auxiliary source of three-phase alternating current power for operating said elevator equipment, said auxiliary source of power comprising a three-phase alternating current generator, an electrically operated two-way switch adapted to alternately connect said elevator equipment to said main line and auxiliary sources of power, a plurality of electrically actuated relay switches connected in Y to the main line source of power across the main line source of power, the switches of said relays being connected in series whereby the failure of any one phase of the main line source of supply will open the circuit of said switches, an electrically operated switch actuated by said phase failure relay switches, said control operating the auxiliary generator in timed relation to the function of the main line source of power and the electrically operated two-way switch in timed relation to the function of the auxiliary power source generator, said electrical control comprising an electrically operated switch connected in series with said phase failure relay switches and a constant source of electrical energy, a pair of electrically operated two-way switches actuated by said above mentioned relay, a timer motor operated by one of said two-way switches and movable contacts operated by said motor for controlling the circuits to the electrically operated two-way switch, the auxiliary generator and the elevator equipment itself in timed relation.

11. An electrical auxiliary elevator control apparatus for electrical elevator operating equipment comprising a main line source of three-phase alternating current power for operating said elevator equipment, an auxiliary source of three-phase alternating current power for operating the elevator equipment, said auxiliary source of power comprising a three-phase alternating current generator, an electrically operated two-way switch adapted to alternately connect said elevator equipment to said main line and to auxiliary sources of power, a plurality of electrically actuated relay switches connected in Y to the main line source of power across the main line source of power, the switches of said relays being connected in series whereby the failure of any one phase of the main line source of supply will open the circuit of said switches, an electrical control actuated by means of phase failure relay switches, said control operating the auxiliary generator in timed relation to the function of the main line source of power and to the electrically operated two-way switch in timed relation to the function of the auxiliary power source generator, said electrical control comprising an electrically operated switch connected in series with said phase failure relay switches and a constant source of electrical energy, an electrically operated pair of two-way switches actuated by above-mentioned relay, a timer motor operated by one of said two-way switches and movable controls operated by said motor for controlling the circuits to the electrically operated two-way switch, the auxiliary generator and the elevator equipment itself in timed relation, and a phase controlling means connected to said elevator equipment for controlling the current phase rotation to said elevator equipment from both the main and auxiliary sources of power, said phase controlling means comprising a reverse phase relay switch connected to said elevator equipment, an electrically operated phase reversing switch having a pair of coils or solenoids connected in series with two of the lines leading to said elevator equipment, a pair of switch contacts connected to said reverse phase relay, each of said contacts being connected in series with one of the said coils or solenoids.

RUSSELL W. RAINE.
PHILIP G. SUTKER.

REFERENCES CITED

The following references are of record in the file of this patent:

UNITED STATES PATENTS

| Number | Name | Date |
|---|---|---|
| 1,025,590 | Rice | May 7, 1912 |
| 1,182,265 | Gale | May 9, 1912 |
| 1,279,392 | Martinetto | Sept. 1, 1918 |
| 1,662,366 | Cosgray | Mar. 13, 1928 |
| 1,888,856 | Fuller | Nov. 22, 1932 |
| 2,003,036 | Callahan | May 28, 1935 |
| 2,427,678 | Laging | Sept. 23, 1947 |
| 2,451,976 | Reagan et al. | Oct. 19, 1948 |